No. 760,349. PATENTED MAY 17, 1904.
A. J. ROBERTSON.
WHEEL.
APPLICATION FILED AUG. 22, 1903.
NO MODEL.

Witnesses:
W. H. Cotton
J. W. Beckstrom

Inventor.
Archibald J. Robertson.
By Theo. H. Townsend
Atty.

No. 760,349.  
Patented May 17, 1904.

UNITED STATES PATENT OFFICE.

ARCHIBALD J. ROBERTSON, OF CHICAGO, ILLINOIS.

WHEEL.

SPECIFICATION forming part of Letters Patent No. 760,349, dated May 17, 1904.

Application filed August 22, 1903. Serial No. 170,477. (No model.)

*To all whom it may concern:*

Be it known that I, ARCHIBALD J. ROBERTSON, a subject of the King of Great Britain, and a resident of Chicago, in the county of Cook and State of Illinois, have invented certain new and useful Improvements in Wheels, of which the following is a specification.

This invention relates to wheels of the character shown and described in my application for United States Letters Patent filed March 4, 1903, Serial No. 146,193; and it consists generally in an improved application of the principles of that invention.

The present improvement, moreover, attains great simplicity of construction, and further consists in the various details thereof and in combination of parts, as hereinafter more fully described, and particularly pointed out in the claims.

My invention will be more readily understood by reference to the accompanying drawings, forming a part of this specification, and in which—

Figure 1:
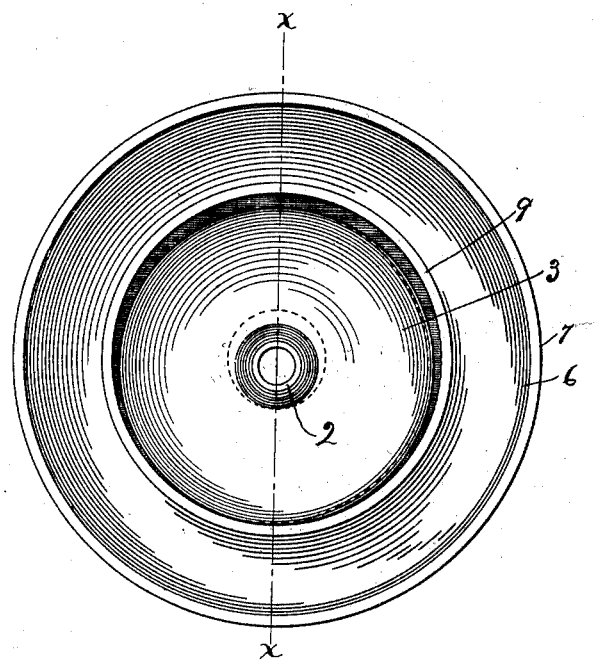
Figure 2:
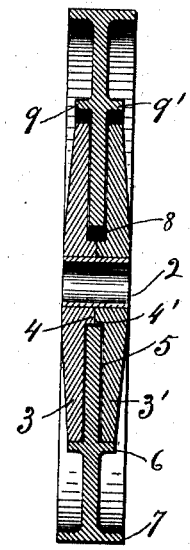
Figure 3:
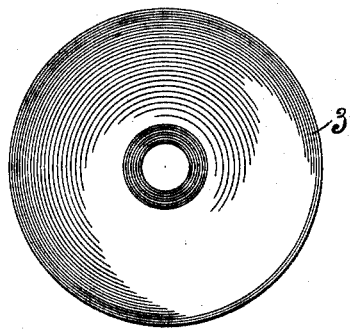
Figure 4:
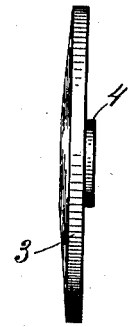

Figure 1 is a side elevation of a wheel embodying my invention. Fig. 2 is a vertical section thereof on the line $xx$ of Fig. 1. Fig. 3 is a side elevation of one of the two inner rotating elements, which are counterparts of each other. Fig. 4 is an end elevation of Fig. 3.

As will become apparent, the present invention may be fixed to and revolve with the axle or be provided with suitable bearings and rotate upon and independently thereof. I have preferred to show and describe the latter construction, numeral 2 in the drawings referring to a steel or other metal tube, providing not only a journal-box, but a support upon which the two counterpart rotating elements 3 and 3' are secured. Each of these rotating elements 3 and 3' comprises a disk, one face thereof being preferably perpendicular to the axis and for strength and lightness the other being slightly inclined thereto, giving the disk the configuration of a flattened cone. Each of these disks is provided upon its perpendicular face with a small annular flange or projection 4 and 4', respectively, when said disks are mounted, as shown, upon the tube 2, and thus forming substantially a single rotating element with a comparatively-deep peripheral groove 5. While I do not desire to be limited to any specific manner of mounting said disks upon the tube or axle 2, for strength and simplicity I prefer to press said disks thereupon by hydraulic pressure in a well-known manner, this particular feature forming no part of my invention.

The outer rotating element 6 is for strength and lightness preferably of the configuration shown, comprising a disk-faced wheel, provided with a peripheral flange 7, a comparatively large central aperture 8, and opposite annular projections 9 and 9' of slightly-greater diameter than that of the disks 3 and 3'. These projections provide a tread for each of the two inner rotating elements, the aperture being of large enough diameter that it contacts at no time with the annular projections 4 4', which together bridge said aperture.

Fig. 1 illustrates the relative positions occupied by the rotating elements when the wheel is at rest, the smaller dotted-line circle indicating the central aperture of the outer element. When the propelling power is applied to the vehicle or to the axle of the wheel, movement of the inner rotating elements will ensue in the direction of the force, causing the vehicle's weight to be sustained upon a line oblique to the perpendicular, and consequently imparting to the outer element a movement in the same direction to establish an equilibrium of forces to restore the center of gravity to the vertical. The larger dotted-line circle indicates the relative positions of the parts when this force is applied. When constant locomotion or movement of the vehicle takes place, the result may be said to be a constant pursuit of gravity's center, and in this action lies one of the advantages which accrue, in view of the fact that the weight of the vehicle is utilized to a certain extent in effecting or facilitating this propulsion.

The present device is designed to furnish, furthermore, what is known as an "independent wheel" for railway rolling-stock. The friction which ordinarily occurs between the rail and the periphery of the inner wheel when rounding a curve, opposite wheels rotating with a common axle, both the present invention and the one hereinbefore referred to enable me to distribute between the aforementioned points and the parts of the wheel itself. My invention is also adapted to an embodiment which more nearly eliminates this friction and which consequently is peculiarly suited to vehicles of light construction. While it is not claimed that this friction is entirely eliminated, there is undoubtedly a very beneficial roller-bearing effect and a desirable distribution of said friction, which enables me to provide for all practical purposes a substantially independent wheel upon a fixed axle.

It is doubtless needless to say that the inner rotating element is constructed in two counterpart halves merely to permit of the assembling of the parts of the wheel, one of the parts, 3 or 3', being first pressed upon the axle, then the body of the outer element adjusted, and, finally, the other part, 3' or 3, similarly pressed to place. The resultant peripheral groove should be of sufficient dimensions to permit of perfect freedom of movement of the outer element.

While I have illustrated my invention as applied to a wheel provided with a flat peripheral flange or tire adapted for road-vehicles of all sorts, it is obvious that I may provide the same with the usual retaining-flange, thus adapting it for car-trucks designed to travel upon parallel rails or tracks.

Many modifications of the minor details of my improved wheel will doubtless readily suggest themselves to those skilled in the art to which it appertains, and I therefore do not desire to limit myself to the specific construction herein shown and described.

Having thus described my invention, I claim as new and desire to secure by Letters Patent—

1. In a wheel, the combination of a peripherally-grooved inner rotating element and an outer element rotatable within said groove and independently of said inner element.

2. In a wheel, the combination, with a peripherally-grooved inner rotating element, of a centrally-apertured disk-faced wheel rotatable within said groove and independently of said inner element.

3. In a wheel, the combination of a peripherally-grooved inner rotating element, of an outer element rotatable within said groove and independently of said inner element, and an annular tread upon said outer element, against which said inner element constantly bears.

4. In a wheel, the combination of an axially-mounted inner rotating element having a peripheral groove, of a centrally-apertured outer rotating element partially inclosed by said groove and rotatable independently therein.

5. In a wheel, the combination of an inner rotating element comprising counterpart disk-like halves fixed upon an axle to comprise substantially a single member having a peripheral groove, of a centrally-apertured outer rotating element having a portion thereof disposed within said groove and rotatable independently of said inner element.

6. In a wheel, the combination of an inner rotating element comprising counterpart disk-like halves fixed upon an axle to comprise substantially a single member having a peripheral groove, of a centrally-apertured outer rotating element having a portion thereof disposed within said groove and rotatable independently of said inner element, and a tread upon said outer element against which said inner element constantly bears.

7. In a wheel, the combination, with an axially-mounted rotating element having a peripheral groove, of a centrally-apertured rotating element partially within said groove and rotatable independently of said inner element, and provided with an annular tread against which said inner element constantly bears.

In testimony of the foregoing I have hereunto set my hand in the presence of two witnesses.

ARCHIBALD J. ROBERTSON.

Witnesses:
GEORGE W. BURTON,
ELLA BERMAN.